(12) United States Patent
Shahand et al.

(10) Patent No.: US 11,163,747 B2
(45) Date of Patent: Nov. 2, 2021

(54) TIME SERIES DATA FORECASTING

(71) Applicant: ServiceNow, Inc., Santa Clara, CA (US)

(72) Inventors: Shayan Shahand, Amsterdam (NL); Aida Rikovic Tabak, Amsterdam (NL); Robert Ninness, Amsterdam (NL); Abhijith Thette Nagarajan, Amstelveen (NL); Prabhakaran Subramani Thandayuthapani, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 1079 days.

(21) Appl. No.: 15/588,088

(22) Filed: May 5, 2017

(65) Prior Publication Data
US 2018/0322400 A1 Nov. 8, 2018

(51) Int. Cl.
G06F 16/23 (2019.01)
G06Q 30/00 (2012.01)
G06Q 30/02 (2012.01)
G06F 11/30 (2006.01)
G06Q 10/06 (2012.01)
G06F 17/18 (2006.01)
(Continued)

(52) U.S. Cl.
CPC .......... G06F 16/23 (2019.01); G06F 11/30 (2013.01); G06F 17/18 (2013.01); G06Q 10/04 (2013.01); G06Q 10/063 (2013.01); G06Q 30/016 (2013.01); G06Q 30/02 (2013.01); G06N 20/00 (2019.01)

(58) Field of Classification Search
CPC .......... G06F 17/18; G06N 3/08; G06N 20/00; G06Q 10/04
See application file for complete search history.

(56) References Cited

U.S. PATENT DOCUMENTS 6,321,229 B1 11/2001 Goldman
6,609,122 B1 8/2003 Ensor
(Continued)

OTHER PUBLICATIONS

Chalermarrewong et al., "Failure Prediction of Data Centers Using Time Series and Fault Tree Analysis", IEEE, 2012. (Year: 2012).*
(Continued)

Primary Examiner — Benjamin P Geib
(74) Attorney, Agent, or Firm — Fletcher Yoder PC

(57) ABSTRACT

Time series data is generated and forecasted with a selected forecasting mechanism. Time series data to forecast including a plurality of data points is received. A count of the plurality of data points is determined to meet a threshold. Responsive to that determination, a plurality of test forecasts are generated with respective forecasting mechanisms of a plurality of forecasting mechanisms using a first subset of the plurality of data points. Errors are then determined for the respective forecasting mechanisms, such as based on comparisons of corresponding ones of the plurality of test forecasts and a second subset of the plurality of data points. One of the plurality of forecasting mechanisms is selected based on the errors. An output forecast is then generated with the selected forecasting mechanism using the first and second subsets of the plurality of data points.

18 Claims, 7 Drawing Sheets

(51) Int. Cl.
*G06Q 10/04* (2012.01)
*G06N 20/00* (2019.01)

(56) References Cited

U.S. PATENT DOCUMENTS

| | | | |
|---|---|---|---|
| 6,611,726 B1 * | 8/2003 | Crosswhite | G06F 17/18 700/99 |
| 6,799,189 B2 | 9/2004 | Huxoll | |
| 6,816,898 B1 | 11/2004 | Scarpelli et al. | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,980,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,412,084 B2 | 4/2013 | Ishida et al. | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,137,115 B2 | 9/2015 | Mayfield | |
| 9,239,857 B2 | 1/2016 | Trinon | |
| 9,323,801 B2 | 4/2016 | Morozov | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,819,629 B2 | 11/2017 | Moon | |
| 9,852,165 B2 | 12/2017 | Morozov | |
| 10,002,203 B2 | 6/2018 | George | |
| 2017/0091622 A1 * | 3/2017 | Taylor | G06N 20/00 |
| 2018/0300737 A1 * | 10/2018 | Bledsoe | G06Q 30/0202 |

OTHER PUBLICATIONS

Hyndman, Rob J. "Measuring forecast accuracy." Business forecasting: Practical problems and solutions (2014): 177-183. (Year: 2014).*

Servicenow, ServiceNow Documentation, "Forecasting Performance Analytics Data", Date Unknown, Downloaded May 3, 2017, 3 pp.

Taylor, Sean J., et al., "Forecasting At Scale", Jan. 13, 2017, 17 pp.

* cited by examiner

TIME SERIES DATA FORECASTING

BACKGROUND

An electronic computing and communications system can process information using software executing on servers at a datacenter. Information about the performance of the software can be collected using performance management tools. An administrator or other user of the software can analyze the performance information to manage services available through the software, such as to resolve issues identified by the performance information.

SUMMARY

Disclosed herein are implementations of systems and techniques for time series data forecasting.

In an implementation, a system is provided for time series data forecasting. The system comprises a memory and a processor. The memory includes instructions executable by the processor to receive time series data to forecast. The time series data includes a plurality of data points. The memory further includes instructions executable by the processor to determine that a count of the plurality of data points meets a threshold. The memory further includes instructions executable by the processor to, responsive to the determination that the count meets the threshold, generate a plurality of test forecasts with respective forecasting mechanisms of a plurality of forecasting mechanisms using a first subset of the plurality of data points. The memory further includes instructions executable by the processor to determine errors for the respective forecasting mechanisms. The instructions to determine the errors include instructions to compare corresponding ones of the plurality of test forecasts to a second subset of the plurality of data points. The memory further includes instructions executable by the processor to select one of the plurality of forecasting mechanisms based on the errors. The memory further includes instructions executable by the processor to generate an output forecast with the selected forecasting mechanism using the first and second subsets of the plurality of data points.

In an implementation, a method is provided for time series data forecasting. The method comprises receiving time series data to forecast. The time series data includes a plurality of data points. The method further comprises determining whether a count of the plurality of data points meets a threshold. The method further comprises, responsive to determining that the count meets the threshold, generating a plurality of test forecasts with respective forecasting mechanisms of a plurality of forecasting mechanisms using a first subset of the plurality of data points. The method further comprises determining errors for the respective forecasting mechanisms by comparing corresponding ones of the plurality of test forecasts to a second subset of the plurality of data points. The method further comprises selecting one of the plurality of forecasting mechanisms based on the errors. The method further comprises generating an output forecast with the selected forecasting mechanism using the first and second subsets of the plurality of data points.

In an implementation, a non-transitory computer-readable storage medium is provided comprising processor-executable routines that, when executed by a processor, facilitate a performance of operations. The operations comprise determining a count of data points to forecast. The operations further comprise running a plurality of forecasting mechanisms against a subset of data points to generate respective test forecasts. The subset of data points excludes, from a set of data points, excluded data points according to the count of data points to forecast. The operations further comprise determining respective errors for the plurality of forecasting mechanisms based at least on comparisons between data points of the respective test forecasts and the data points excluded from the subset of data points. The operations further comprise selecting a forecasting mechanism from the plurality of forecasting mechanisms based at least on the respective errors. The operations further comprise running the selected forecasting mechanism against the set of data points.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
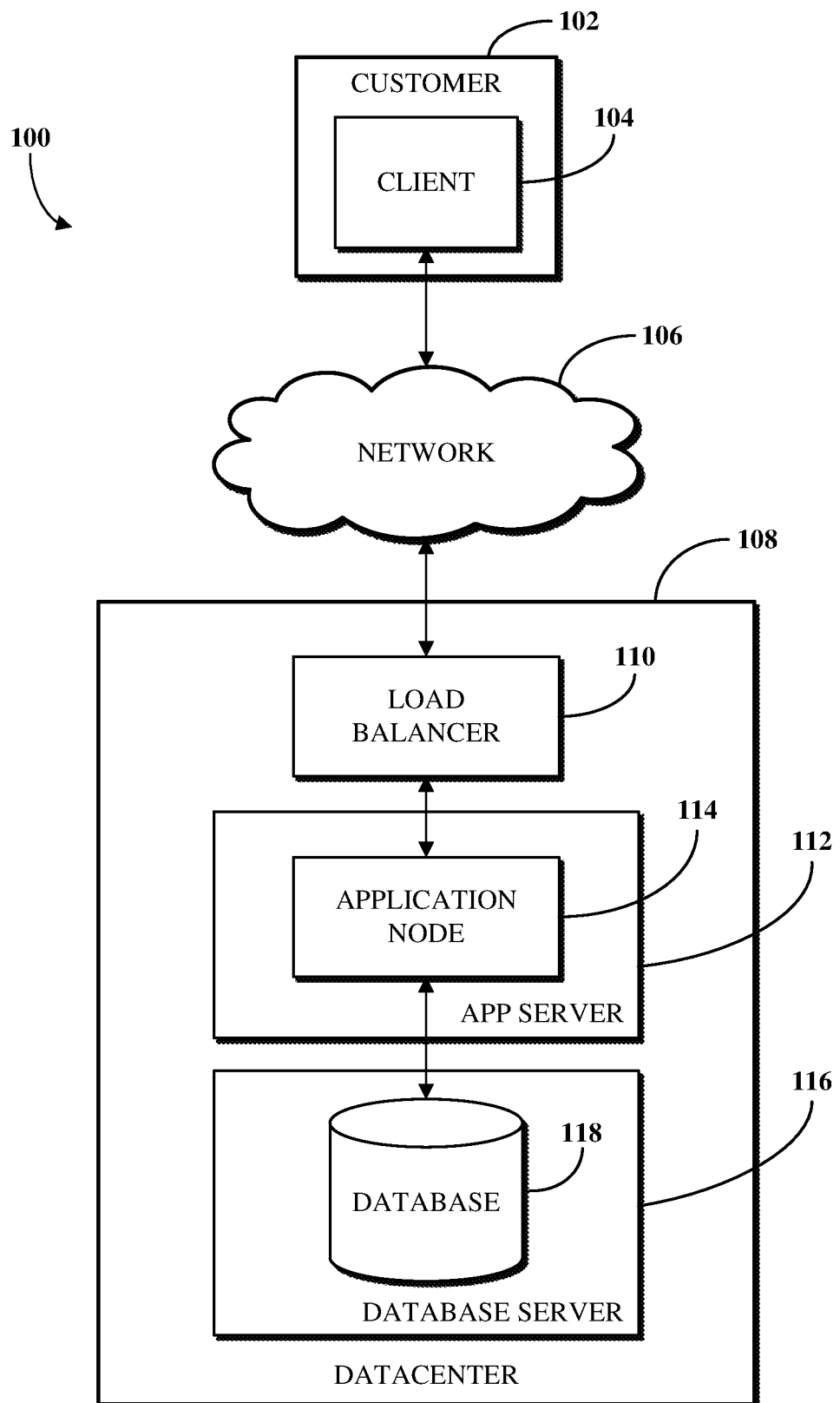
FIG. 1 is a block diagram of an example of an electronic computing and communications system.

Customers of a computing (e.g., Platform-as-a-Service (PaaS)) provider can use or develop application software that operates on or using configurable platform software. For example, the application software can include Information Technology Infrastructure Library (ITIL) or like functionality, such as for processing incidents, publishing articles, operating service catalogs, other purposes, or combinations thereof. The configurable platform software can include functionality permitting customers of a computing provider to monitor conditions associated with aspects of their application software using performance metrics, such as time series data. An instance of the platform software can be implemented using one or more application nodes and database nodes, such as described later with respect to FIG. 1.

The time series data can be generated using the configurable platform software to represent indicator values indexed in a time order. An indicator, which may be but is not limited to a key performance indicator (KPI), performance score, or the like, is a measurement of data that may be used, for example, to better understand the performance of application software. An example indicator is a count of open incidents. The measurements of an indicator are referred to as indicator values. For example, there may be 500 open incidents on a Monday at 3 PM, and there may be 400 open incidents on the next day at 4 PM. The counts of 500 or 400 are indicator values for an indicator (e.g., a KPI) indicative of a number of open incidents.

Indicator values can be reviewed and analyzed, such as to identify issues within application software or prepare solutions for resolving those issues. For example, a customer of a computing provider may use indicators to determine that incidents within its application software remain open for too long and modify its internal procedures to limit the periods of time that are available for resolving incidents. In some cases, performance analytics functionality of an instance of platform software may include functionality for forecasting future values of indicators. For example, indicator values that have been collected for the instance of platform software can be used to generate forecasts for those indicator values. These forecasts can be used, for example, to prevent the instance of platform software from experiencing performance issues or to mitigate the extent of those performance issues.

A forecast of indicator values can be generated using a forecasting mechanism, which may, for example, include a specific technique for determining forecasted values for an indicator. A forecasting mechanism may refer to instructions executable or interpretable by a processor of a computing device to generate forecasts of time series data (e.g., which may be a set of indicator values indexed over time). There may be one or more forecasting mechanisms available for forecasting indicator values for the customer instance. However, it may not be clear which of the available forecasting mechanisms is optimal for forecasting values of an indicator. For example, the techniques used by a linear forecasting mechanism may not be optimal where the indicator values do not fit a linear regression well. Similarly, the techniques used by a naïve seasonal forecasting mechanism may not be optimal for forecasting indicator values that do not have seasonal relationships.

If a non-optimal forecasting mechanism is used to forecast indicator values, the resulting forecasted indicator values may be less accurate than forecasted indicator values produced with another forecasting mechanism. Meanwhile, issues that may otherwise have been indicated by forecasting with that other forecasting mechanism may remain unmitigated and potentially result in instance reduction in performance, as measured by the indicator.

Implementations of this disclosure address problems such as these by selecting a forecasting mechanism for forecasting time series data and generating an output forecast for the time series data with the selected forecasting mechanism. The time series data can be generated and forecasted within an instantiated software environment, such as an instance of platform software. A component configured to forecast the time series data for the instantiated software environment can use a plurality of forecasting mechanisms to forecast different types of time series data. Data points of time series data received by that component can be used to select one of the forecasting mechanisms based on a period of time over which to forecast the time series data. For example, a subset of the data points can be used to generate test forecasts with respective forecasting mechanisms. The test forecasts can then be compared to another subset of the data points to determine errors for the respective forecasting mechanisms. The forecasting mechanism having a lowest error can then be selected, and an output forecast can be generated with the selected forecasting mechanism using the time series data.

Implementations of this disclosure provide technological improvements particular to computer networks, for example, those concerning the forecasting of time series data generated using an instance of software (e.g., an instance of configurable platform software of a customer of a computing provider). Computer network-specific technological problems, such as the selection of an optimal forecasting mechanism to use for forecasting time series data, can be wholly or partially solved by implementations of this disclosure. For example, software executing at an instance can generate the time series data using user data associated with the instance. The time series data can be used to generate an output forecast therefor, such as based on a specified number of periods over which to forecast the time series data. The test forecasts generated based on that specified number of periods can then be used for the selection of an optimal forecasting mechanism. Implementations of this disclosure can thus introduce new and efficient improvements in the ways in which the performance of an instantiated software environment can be forecasted, such as by determining an optimal forecasting mechanism for performing the forecasting.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, an instance of platform software implemented by the application node 114 and the database node 118 can include functionality for generating and forecasting time series data. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
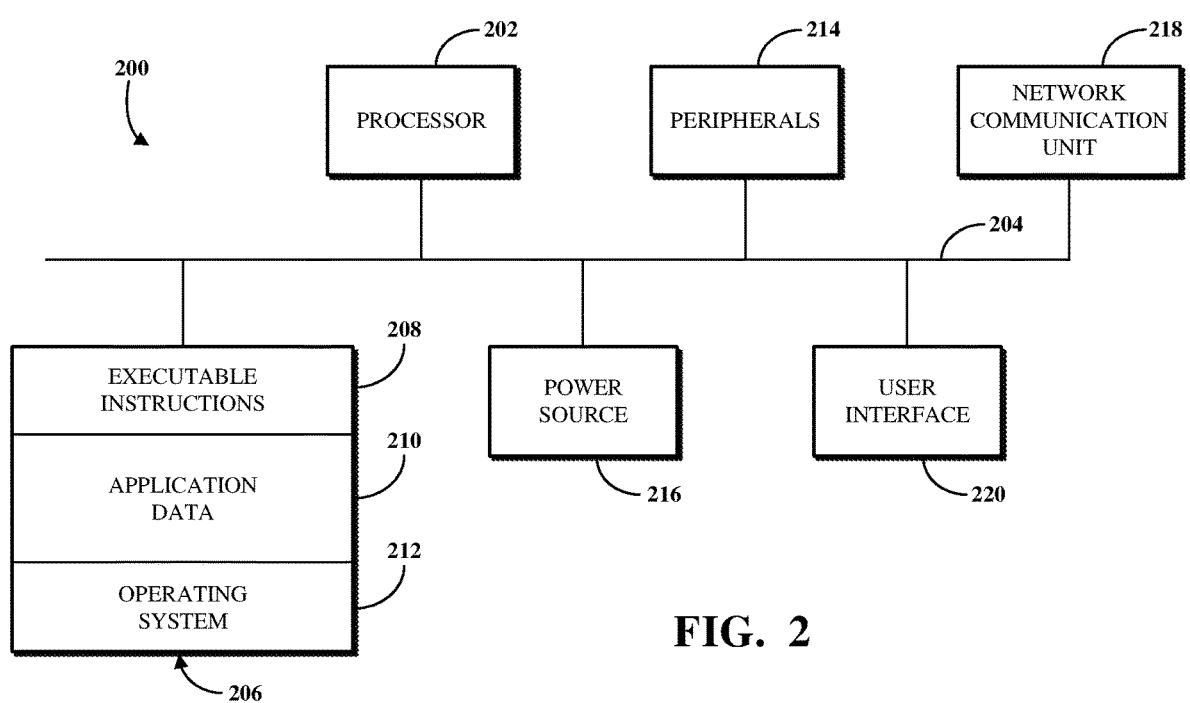
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to receive time series data to forecast, determine that a count of data points of the time series data meets a threshold, generate test forecasts with respective forecasting mechanisms using a first subset of the data points, determine errors for the respective forecasting mechanisms, select one of the plurality of forecasting mechanisms based on the errors, and generate an output forecast with the selected forecasting mechanism.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
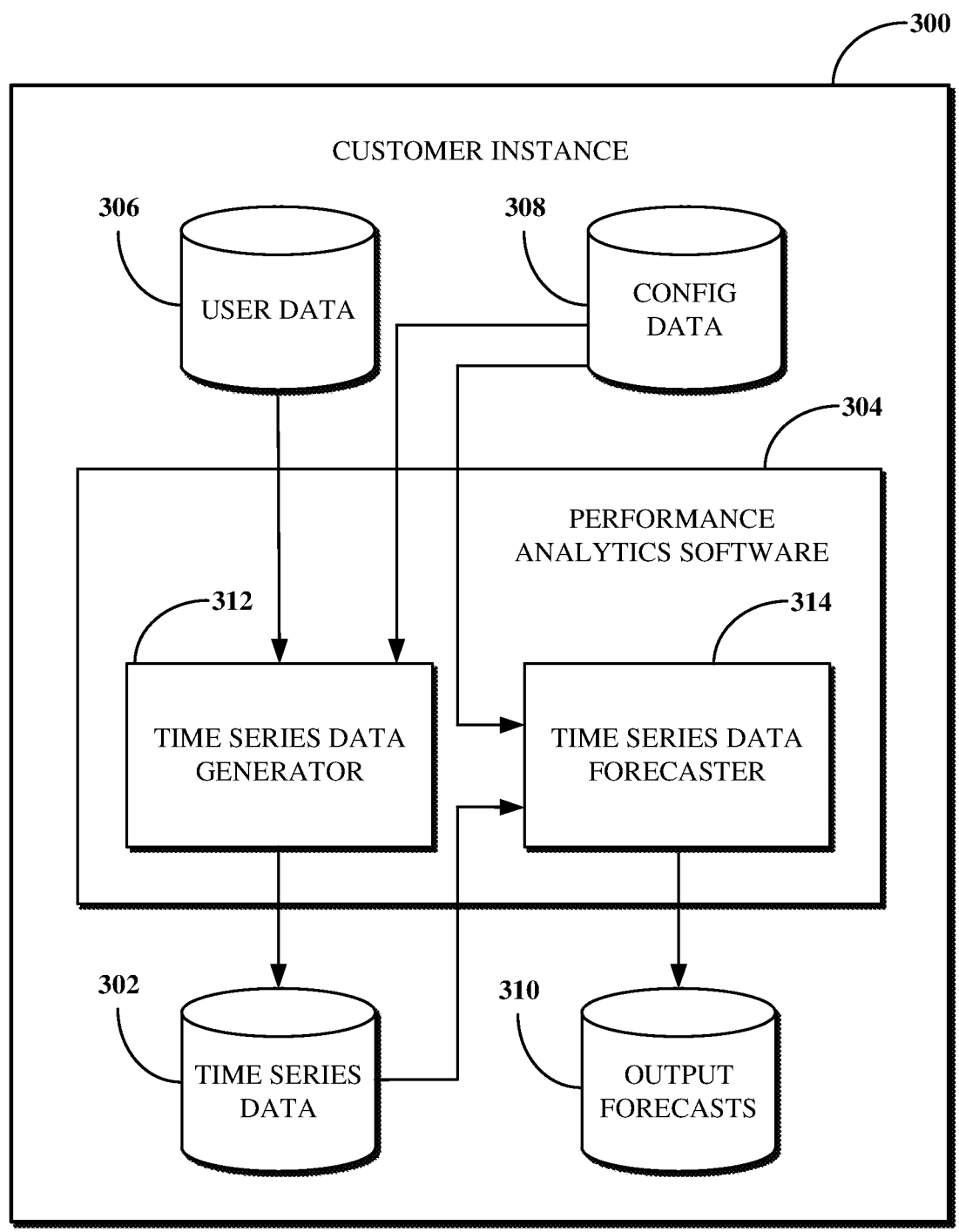
FIG. 3 is a block diagram of an example of a customer instance including functionality for generating and forecasting time series data.

FIG. 3 is a block diagram of an example of a customer instance 300 including functionality for generating and forecasting time series data 302. The customer instance 300 can be an instance of software used or otherwise configured or developed by a customer of a computing provider. For example, the customer instance 300 can be an instance of configurable platform software, an instance of application software developed using configurable platform software, another instance of software, or a combination thereof.

The customer instance 300 can be implemented using one or more application nodes and one or more databases, such as the application node 114 and the database node 118 shown in FIG. 1. One or more clients can communicate with the customer instance 300. The clients can be, for example, the client 104 shown in FIG. 1. For example, a client can be a device or virtual machine having access to the customer instance 300.

Performance analytics software 304 executing within the customer instance 300 includes functionality for generating and forecasting the time series data 302. For example, the performance analytics software 304 includes a time series data generator 312 that generates the time series data 302 based on user data 306 and configuration data 308 associated with the customer instance 300. The performance analytics software 304 also includes a time series data forecaster 314 that forecasts the time series data 302 to generate output forecasts 310 based on the time series data 302 and the configuration data 308.

The user data 306 can include incidents, requests, published article views, or other data associated with the customer instance 300. The user data 306 can be generated using computing devices associated with the customer instance 300, received from clients in communication with the customer instance 300, retrieved from a database or other data store external to the customer instance 300, obtained from other sources or using other techniques, or combinations thereof. For example, a computer network within a customer environment (e.g., the customer 102 shown in FIG. 1) may include an agent device that collects the user data 306 from one or more clients or other computing devices within the customer environment and transmits the user data 306 to the customer instance 300. For example, the customer environment may be bounded by firewalls, and the agent device may be configured to open communication with a server device used to implement the customer instance 300.

The configuration data 308 can include indicator definitions. Indicator definitions are definitions of how to generate time series data (e.g., indicator values indexed by time) based on the user data 306. For example, an indicator definition may define a measurement interval (e.g., one day, one week, or the like), an aggregation operation type (e.g., total count, average, median, or the like), a location of the user data 306 to use (e.g., a table of records within a database), other criteria (e.g., status, time open, assignee, or the like), or combinations thereof.

The time series data generator 312 can generate the time series data 302 (e.g., indicator values indexed over time) by querying a database or other data store for records associated with an indicator definition. For example, the performance analytics software 304 can generate an indicator value for the total number of open incidents by querying a database table that stores records associated with incidents of the customer instance 300 for records where the status is "open." For example, the query can be a database statement expressed in a query language, such as the Structured Query Language (SQL), such as "query incident_table where status=open" or the like. Other queries that can be performed to generate the time series data 302 include, for example, a total number of incidents resolved on a particular day (e.g., "query incident_table where status=resolved and data=mmddyyyy"), a total number of item requests fulfilled on a particular day (e.g., "query item_request_table where status=fulfilled and date=mmddyyyy"), a total number of knowledgebase articles viewed on table "kb_use" that were created on a particular date (e.g., "query kb_use where status=published and data=mmddyyyy").

The indicator values generated by the time series data generator 312 can be indexed over time. For example, the times at which queried data is stored in the database or other data store can be used for indexing the indicator values. Alternatively, the database or other data store can include a field indicating a time at which the records thereof were generated.

The time series data generator 312 can generate the time series data 302 on a periodic basis. For example, a scheduled job performed daily can cause the time series data generator 312 to obtain (e.g., receive and/or retrieve) the user data 306 and use applicable ones of the indicator definitions of the configuration data 308 to generate the time series data 302. Alternatively, the time series data generator 312 can generate the time series data 302 based a command, such as an application programming interface (API) call to the performance analytics software 304 received from a client in communication with the customer instance 300.

The time series data 302 includes data points spaced over even time intervals. However, in some cases, the user data 306 used to generate the time series data 302 may include gaps, such as where individual data points that would otherwise be present at certain time intervals are omitted. The customer instance 300 (e.g., using the time series data generator 312 or other functionality) can generate interpolated data points to fill in such gaps based on values of neighboring data points. For example, if more than five neighboring data points are available in the time series data 302, a spline method may be used for the interpolation; otherwise, the linear method may be used. The interpolated data points can be generated after the time series data 302 including gaps is generated. Alternatively, the interpolated data points can be generated responsive to identifying gaps in the user data 306, and the time series data 302 may thereafter be generated to include the interpolated data points.

The time series data forecaster 314 generates the output forecasts 310 by forecasting the time series data 302 using a selected forecasting mechanism. As used herein, a forecasting mechanism can refer to a computer instructions for performing a software process to forecast time series data by taking, as input, data points. The data points taken as input by a forecasting mechanism can include the time series data 302 generated using the performance analytics software 304.

The forecasting mechanisms available for selection by the time series data forecaster 314 can include, but are not limited to, a linear forecasting mechanism, a naïve seasonal forecasting mechanism, a seasonal trend loess (STL) forecasting mechanism, and an auto regressive integrated moving average (ARIMA) forecasting mechanism. Other forecasting mechanisms as may later be contemplated may be available for selection by the time series data forecaster 314. The forecasting mechanisms available for selection by the time series data forecaster 314 can differ in the manner by which they forecast the time series data 302. For example, with the naïve seasonal forecasting mechanism, values of data points to forecast are set to be equal to the last corresponding observed value from the last seasonal period. With the STL forecasting mechanism, the time series data 302 into is decomposed into seasonal, trend, and remainder components. Values of data points to forecast are calculated based on a loess extrapolation of the trend and remainder components. The last period of the seasonal component is then added to the extrapolated data.

The configuration data 308 can specify the forecasting mechanisms available for forecasting time series data associated with an indicator. For example, the configuration data 308 by default may indicate to use the time series data forecaster 314 to select a forecasting mechanism to use to generate the output forecasts 310 for an indicator. However, the configuration data 308 may be modified (e.g., by a user of the customer instance 300), such as to indicate a particular forecasting mechanism for the time series data forecaster 314 to use to generate the output forecasts 310. For example, a user of the customer instance 300 can modify the configuration data 308 to indicate that the STL forecasting mechanism is to be used to generate output forecasts for time series data associated with incidents. The time series data forecaster is further described below with respect to FIG. 4.

The output forecasts 310 can be used to determine how aspects of the customer instance 300 may perform in the future. For example, a user of the customer instance can use the output forecasts 310 to project a number of incidents that may be opened in a given month, a number of incidents that may be resolved in a given week, a number of service or catalog requests fulfilled in a given day or that remain open over a week or longer period of time, or like data associated with performance analytics. The user of the customer instance 300 may thus modify aspects of the customer instance 300 according to the output forecasts 310, such as to mitigate potential future performance issues indicated by the output forecasts 310. However, other uses of the output forecasts 310 are possible.

For example, the output forecasts 310 may be used for intelligent automation of actions, such as to remediate current or future issues associated with the customer instance 300. For example, time series data can indicate that a particular component of a computer network associated with the customer instance 300 is the subject of a number of open incidents. An output forecast generated based on that time series data can reflect that the number of open incidents associated with that component is projected to exceed a threshold at a future date. The customer instance 300 can use the data of the output forecast to take remedial action against that component, for example, to restart it, generate a high priority service ticket for it, begin monitoring a CI representative of the component within a CMDB associated with the customer instance 300, evaluate resource usage by that component, investigate network connectivity issues for that component, clear disk space on that component, or the like, or a combination thereof.

In another example, the output forecasts 310 may be used to automate or otherwise recommend modifications to workflows for users of the customer instance 300. For example, the time series data can reflect a number of workflow steps that are not met by their corresponding deadlines on a daily or weekly basis. In the event that the output forecasts generated based on that time series data indicate that the number of unmet workflow steps is projected to exceed a threshold amount, the customer instance 300 can send a notification to an administrator of the customer instance 300 to recommend a modification to the workflow. Alternatively, the customer instance 300, responsive to determining that that threshold amount may be exceeded, may extend the deadline for certain workflow steps or delete other certain workflow steps.

In yet another example, the output forecasts 310 may be used to identify potential concerns related to the security of the customer instance 300. For example, the time series data can reflect attempts by unauthorized users to access the customer instance 300. In the event that the output forecasts generated based on that time series data indicate that the number of attempted accesses by unauthorized users is projected to exceed a threshold amount, the customer instance 300 can send a notification to an administrator of the customer instance 300 to, for example, indicate one or more components associated with the customer instance 300 through which the unauthorized accesses are attempted. The administrator may use this information to mitigate future unauthorized access attempts through those components. Other examples for using the output forecasts 310 are also possible.

Figure 6:
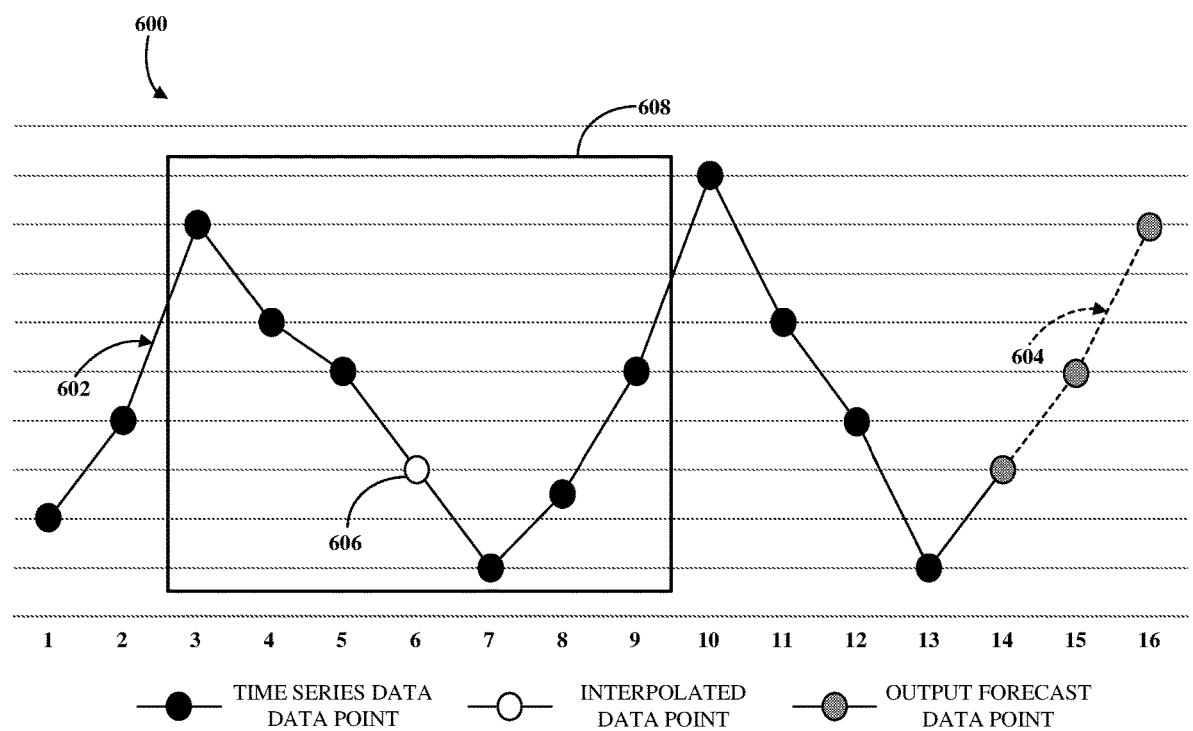
FIG. 6 is an illustration of an example of a graph showing time series data forecasting.

Implementations of the functionality of or data used by the customer instance 300 depicted in FIG. 3 can include additional, less, or combined functionality as compared to that described above, or functionality other than that described above, or combinations thereof. In some implementations, the customer instance 300 (e.g., using the performance analytics software 304) can include functionality for generating a visualization of the output forecasts 310. For example, a graph can be generated to show the time series data 302 and the output forecasts 310 over a number of periods. The data points of the output forecasts 310 can be shown in a different format than the data points of the time series data 302, such as by using dashed versus solid lines, different colors, or the like. An example of a graph of data points of time series data and output forecasts is shown in FIG. 6.

In some implementations, the user data 306 can be received from a second instance of software used to manage functionality and/or data associated with the customer instance 300. For example, the second instance of software can be a customer service instance implemented by a computing provider. The customer service instance can be used to manage accounts authorized for use with the customer instance 300; monitor tasks performed or awaiting performance at the customer instance 300, reviewing incidents, change requests, problems, or the like; request information or services, such as through a service catalog; other functionality; or combinations thereof. The customer service instance can be implemented using one or more application nodes and database nodes, for example, the application node 114 and the database node 118 shown in FIG. 1.

In some implementations, the configuration data 308 may include data such as user input received from a graphical user interface of the customer instance 300. For example, a graphical user interface of the customer instance 300 can include a form within which a user of the customer instance 300 can input data, such as a selection of forecasting mechanisms that may be available to the time series data forecaster 314, a number of periods over which to forecast the time series data 302, a limitation on the time series data 302 that may be used to select the forecasting mechanism or generate the output forecasts 310, or the like.

Figure 4:
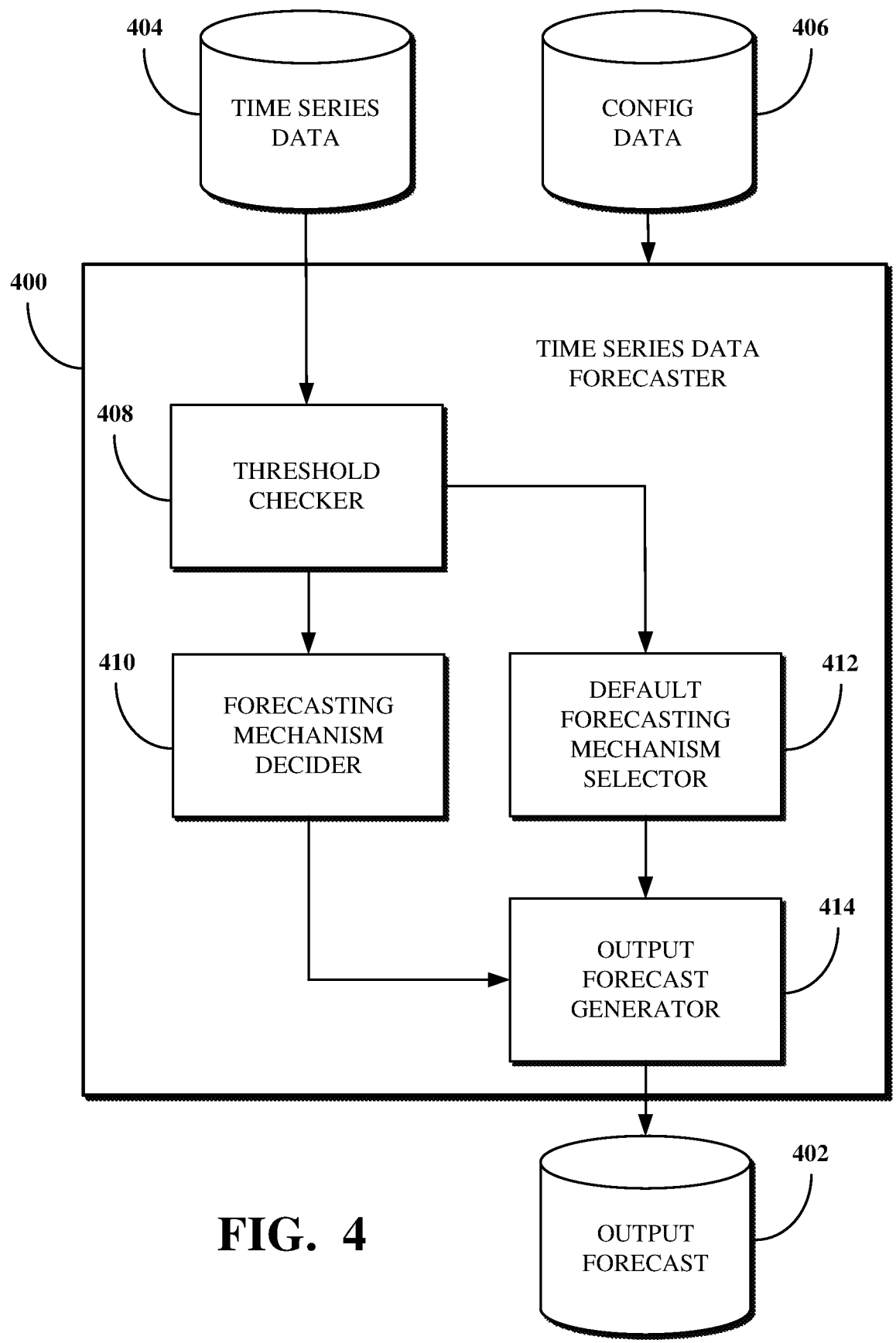
FIG. 4 is a block diagram of an example of a time series data forecaster.

FIG. 4 is a block diagram of an example of a time series data forecaster 400. The time series data forecaster 400 may, for example, be the time series data forecaster 314 shown in FIG. 3. The time series data forecaster 400 can generate an output forecast 402 based on time series data 404 and configuration data 406. The output forecast 402 may, for example, respectively be one of the output forecasts 310 shown in FIG. 3. The time series data 404 and the configuration data 406 may, for example, respectively be the time series data 302 and the configuration data 308 shown in FIG. 3. The time series data forecaster 400 includes a threshold checker 408, a forecasting mechanism decider 410, a default forecasting mechanism selector 412, and an output forecast generator 414.

The time series data forecaster 400 receives the time series data 404 to forecast. The time series data 404 may include data points, for example, generated using a time series data generator, such as the time series data generator 312 shown in FIG. 3. The time series data 404 may be received from the time series data generator, a database used to store time series data, or another component of a customer instance that includes or uses the time series data forecaster 400 (e.g., the customer instance 300 shown in FIG. 3).

The time series data 404 can include values of indicators associated with attributes of a computing device of a computer network, such as a computer network associated with the customer instance (e.g., instance of platform software) used to generate the time series data 404. For example, the data points of the time series data 404 can be indicator values generated for measuring the customer instance based on an indicator. Examples of indicator values may include a total number of open incidents, an average number of item requests fulfilled over a time range, a total number of knowledgebase articles viewed or created on a particular date, or the like.

The time series data 404 can include data other than or in addition to values of indicators. For example, a data point of the time series data 404 can indicate a value of a resource of a computing device of a computer network associated with the customer instance. For example, data points can reflect values indicative of memory usage, processor usage, or other resource usage of the computing device over time. In another example, a data point of the time series data can indicate that a computing device of a computer network associated with the customer instance has experienced a failure. For example, the computing device may have experienced a power or network outage or a hardware failure preventing it from receiving requests from other components of the computer network (e.g., in connection with a computerized service provided using the computer network, a discovery request for components of the computer network, or the like). In another example, the computing device may have been accessed by an unauthorized user, such as where a security mechanism used for the computing device has failed or otherwise been circumvented. Other examples of the data points of the time series data 404 are possible.

The data points of the time series data 404 are generated at discrete time intervals (e.g., based on the configuration data 406). For example, data points associated with certain indicators or other values may be generated once per hour, day, or week, or at another discrete time interval. A period of time may be associated with two or more data points generated over discrete time intervals. For example, when a period of time is a week, it may be associated with seven data points, where one data point was generated each day. In another example, when a period of time is a quarter, it may be associated with thirteen data points, where one data point was generated each week. While the generation of data points is independent of the definition of a period, a period can be defined based on the frequency of data points. For example, indicator values can be generated for an indicator on a weekly basis. A period for those indicator values can be four weeks (e.g., where a seasonal pattern of the indicator values is detected monthly) such that each period includes four of the indicator values. Alternatively, the period can be thirteen weeks (e.g., where a seasonal pattern of the indicator values is detected quarterly) such that each period includes thirteen of the indicator values. A count of data points of the time series data 404 may be described herein using the variable $N_d$. A number of periods of time over which to forecast may be described herein using the variable $P_f$. As used herein, the term "period length" may refer to a number of data points associated with (e.g., generated during) a period of time. A period length may be described herein using the variable PL. As used herein, the term "frequency" may refer to a discrete time interval used for generating a data point. Examples of associated frequencies, period lengths, and periods of time are shown in Table 1:

TABLE 1

| Frequency | Period Length (PL) | Period of Time |
| --- | --- | --- |
| Daily | 7 | Week |
| Weekly | 13 | Quarter |
| Bi-Weekly | 6 | Quarter |
| Four Weekly | 13 | Year |
| Monthly | 12 | Year |
| Bi-Monthly | 6 | Year |
| Quarterly | 4 | Year |
| Fiscal Quarterly | 4 | Year |
| Half Yearly | 2 | Year |
| Yearly | 4 | Four Years |
| Fiscal Yearly | 4 | Four Years |

The output forecast 402 can include a forecast count of data points. For example, a user of the customer instance including the time series data forecaster 400 can specify the forecast count as a count of data points to forecast. A frequency can be determined based on the time series data 404. For example, the data points of the time series data 404 may be collected at discrete time intervals, such as daily, weekly, monthly, or the like. The count of data points specified by the user can be plotted over the frequency associated with the time series data 404 to determine a $P_f$ for the time series data 404. The PL associated with a period of the $P_f$ can then be determined.

In another example, a user of the customer instance including the time series data forecaster 400 can specify a number of periods of time over and a frequency for which to forecast the time series data 404. The forecast count for the specified periods of time can be the PL associated with the specified $P_f$ and frequency. For example, a user of the customer instance can specify to forecast the time series data 404 based on a bi-monthly frequency over one one-year period of time, the PL is six data points. The forecast count would thus include six data points. Stated another way, the forecast count can equal a product of the $P_f$ and the PL associated with a period of the $P_f$.

For purposes of generating the output forecast 402, the time series data 404 may be deemed to include first and second subsets of data points. The count of the second subset of data points is the same as the count of the forecast data points. As such, the count of the second subset of data points is dependent on the forecast count of data points to forecast (e.g., as specified by a user of the customer instance). A count of the first subset of data points includes the count of the remaining data points of the time series data 404. Although the time series data 404 may not be organized or separated into these first and second subsets of data points, the data points of the time series data 404 can be considered to be included within one of the first subset or the second subset. As will be described below, the respective subsets of data points may be used in different ways by the time series data forecaster 400 to generate the output forecast 402.

The threshold checker 408 is used to determine whether a count of the data points of the time series data 404 meets a threshold. For example, the threshold can be used to determine that there are enough data points available to generate the output forecast 402. The threshold can be based on a minimum count of data points and a forecast count of data points to forecast. For example, the minimum count of data points can be equal to two times the PL associated with the number of periods of time and frequency specified by the user of the customer instance. The forecast count of data points to forecast can be used to determine a count of a first subset of data points of the time series data 404, as mentioned above. The threshold can be met where the count of the first subset of data points is greater than or equal to the minimum count of data points. The threshold checker 408 may include checking the time series data 404 against other thresholds.

Responsive to a determination that the count of the data points of the time series data 404 meets the threshold, the forecasting mechanism decider 410 can be used to generate a plurality of test forecasts with respective forecasting mechanisms of a plurality of forecasting mechanisms using the first subset of data points of the time series data 404. The second subset of data points of the time series data 404 can be excluded from use in the generation of a test forecast. A test forecast generated with a forecasting mechanism using the first subset of data points of the time series data 404 can include a number of data points equal to the forecast count. The test forecast can be generated by running the forecasting mechanism against the first subset of data points of the time series data 404.

The forecasting mechanism decider 410 includes functionality for determining errors for the respective forecasting mechanisms. Determining the errors for the respective forecasting mechanisms can include comparing corresponding ones of the test forecasts to the second subset of data points of the time series data 404. For example, the errors can be mean absolute scaled error (MASE) scores determined for the test forecasts based on the respective forecasting mechanisms with which the respective test forecasts are generated. The MASE scores determined for the test forecasts are used to evaluate the accuracy of the forecasting mechanisms. For example, an MASE score for a forecasting mechanism can be determined by comparing the test forecast generated with that forecasting mechanism and the second subset of data points of the time series data 404. The MASE score can reflect an error indicative of a difference between the test forecast and the second subset of data points. In another example, the errors can be scores determined using techniques other than MASE, such as root-mean-square-deviation or the like.

The forecasting mechanism decider 410 includes functionality for selecting one of the forecasting mechanisms used to generate the test forecasts based on the errors determined for those forecasting mechanisms. For example, the forecasting mechanism decider 410 can select a forecasting mechanism responsive to a determination that the test forecast generated with that forecasting mechanism has a lowest MASE score, such as compared to the MASE scores determined for all of the respective forecasting mechanisms with which test forecasts were generated.

However, in some cases, $N_d$ may be too low to generate a test forecast with a forecasting mechanism. For example, some forecasting mechanisms can have minimum requirements for $N_d$. Those forecasting mechanisms may not be selectable by the forecasting mechanism decider (e.g., since test forecasts may not be generated with those forecasting mechanism). For example, those forecasting mechanisms may require a greater seasonality for the data points of the time series data in order to generate forecasted data points. Examples of minimum requirements for forecasting mechanisms are shown in Table 2:

TABLE 2

| Forecasting Mechanism | Minimum Requirement |
| --- | --- |
| Linear | Two Data Points |
| Naïve Seasonal | One Period |
| Seasonal Trend Loess | Two Periods |

After a forecasting mechanism is selected, the output forecast generator 414 can generate the output forecast 402. The output forecast 402 is generated with the selected forecasting mechanism using the first and second subsets of data points of the time series data 404. For example, unlike with the generation of the test forecasts described above, the generation of the output forecast 402 may not exclude either of the first or second subsets of data points. For example, the output forecast generator 414 can generate the output forecast 402 with consideration of all of the data points of the time series data 404.

In some cases, the default forecasting mechanism selector 412 may be used instead of the forecasting mechanism decider 410. For example, the default forecasting mechanism selector 412 can select a default forecasting mechanism of the plurality of forecasting mechanisms responsive to a determination (e.g., using the threshold checker 408) that the count of the plurality of data points of the time series data 404 does not meet the threshold. For example, the default forecasting mechanism selector 412 can be used when the count of the first subset of data points of the time series data 404 is less than a minimum count of data points. The default forecasting mechanism can be selected from the plurality of forecasting mechanisms according to an order of the plurality of forecasting mechanisms and requirements of the plurality of forecasting mechanisms.

For example, the forecasting mechanisms of the plurality of forecasting mechanisms can be tested in the defined order, and the first tested forecasting mechanism to have its requirements be met by the test can be selected using the default forecasting mechanism selector 412 as the selected forecasting mechanism with which to generate the output forecast 402 using the output forecast generator 414. For example, the order of the forecasting mechanisms can indicate to first use the STL, then Naïve Seasonal, and finally Linear forecasting mechanisms. The order may be configurable by a user of the customer instance. Alternatively, the order may be configurable only by select users of the customer instance, such as administrators or authorized users of the computing provider implementing the customer instance. The requirements of one of the forecasting mechanisms can be deemed to be satisfied where an MASE score determined therefor satisfies a threshold value (e.g., where the determined MASE score is less than a maximum score).

Implementations of the functionality of or data used by the time series data forecaster 400 depicted in FIG. 4 can include additional, less, or combined functionality as compared to that described above, or functionality other than that described above, or combinations thereof. In some implementations, the time series data forecaster 400 can include functionality for causing remedial actions to be performed in certain situations. For example, the data points of the plurality of data points may correspond to incidents associated with an instance of platform software used to generate the time series data 404 (e.g., and which includes the time series data forecaster 400). Responsive to a determination that the count of the plurality of data points meets a threshold, the time series data forecaster 400 can transmit instructions to perform a remedial action to resolve at least some of the incidents. For example, the threshold can be a maximum number of incidents detected before remedial action should be taken.

In some implementations, the forecasting mechanism selected using the forecasting mechanism decider 410 or the default forecasting mechanism selector 412 may be reused. For example, the selected forecasting mechanism can be cached or otherwise stored for later use for the time series data 404 or a different set of time series data. Other output forecasts can be generated with the selected forecasting mechanism, such as without using the forecasting mechanism decider 410 or the default forecasting mechanism selector 412. For example, the time series data 404 may be repeatedly forecasted, such as on a daily basis. Generating output forecasts without repeating the operations to select a forecasting mechanism can conserve computing resources and time.

In another example, an output forecast can be generated with a previously-selected forecasting mechanism for a different set of time series data that may be similar to the time series data 404. For example, the time series data 404 may include values of low priority incidents, whereas the different set of time series data may include values of high priority incidents. The selected forecasting mechanism may be removed from the cache or other storage upon the expiration of a staleness period (e.g., a definite period of time). Because that forecasting mechanism is no longer available for reuse, the time series data forecaster 400 then repeats the forecasting mechanism selection operations to select another forecasting mechanism. Imposing a limited amount of time for reusing a selected forecasting mechanism can, for example, prevent an output forecast from being generated with a forecasting mechanism that may eventually no longer be optimal, such as where the values of the time series data change over time.

In some implementations, the data points of the time series data 404 may not be generated on a periodic basis (e.g., at discrete time intervals). For example, some or all of the data points of the time series data 404 may be generated on a non-periodic basis, such as based on commands to generate the data points received from a client.

In some implementations, not all data points of the time series data 404 may be relevant for generating the output forecast 402. For example, the time series data forecaster 400 can use a subset of the time series data 404 associated with a given indicator to generate the output forecast 402. For example, a user of the customer instance can limit the time series data 404 to be used by the time series data forecaster 400 based on a time range within which the time series data 404 was generated. In another example, the configuration data 406 can indicate to limit the time series data 404 to be used by the time series data forecaster 400 based on attributes of the time series data 404. For example, where the time series data 404 represents values of incidents, the configuration data 406 can indicate that only those values associated with high priority incidents are to be used by the time series data forecaster 400.

In some implementations, the time series data forecaster 400 or another component of the customer instance can generate a user interface including one or more visualizations for the output forecast 402. For example, a user of the customer instance may have access to a dashboard, portal, or like user interface including one or more scorecards, widgets, graphs, or other visualizations of the output forecast 402. The user of the customer instance may review the data presented in these visualizations to determine how aspects of the customer instance are currently performing, a projected time at which performance targets for the customer instance may be met, a degree to which performance (e.g., incident resolution or the like) is improving or failing to improve, or other considerations.

In some implementations, the number of periods of time over which to forecast the time series data 404 may not be used to select a forecasting mechanism. For example, a different property can define a replacement value for the number of periods of time. If the replacement values are greater than the number of periods of time, the replacement values are not used. However, if the replacement values are less than or equal to the number of periods of time, the replacement values can be used.

In some implementations, a user of the customer instance can select a specific forecasting mechanism to use to generate the output forecast 402. For example, the user can indicate the selected forecasting mechanism within a same user interface (e.g., form) through which he or she indicates the number of periods of time and frequency for the forecasting. The selection by a user of a specific forecasting mechanism can omit the forecasting mechanism decider 410 and the default forecasting mechanism selector 412 from being used. Alternatively, the default forecasting mechanism selector 412 (or another component of the time series data forecaster 400) can be used to determine that the requirements for the selected forecasting mechanism specified by the user are met before that selected forecasting mechanism is used to generate the output forecast 402.

Figure 5:
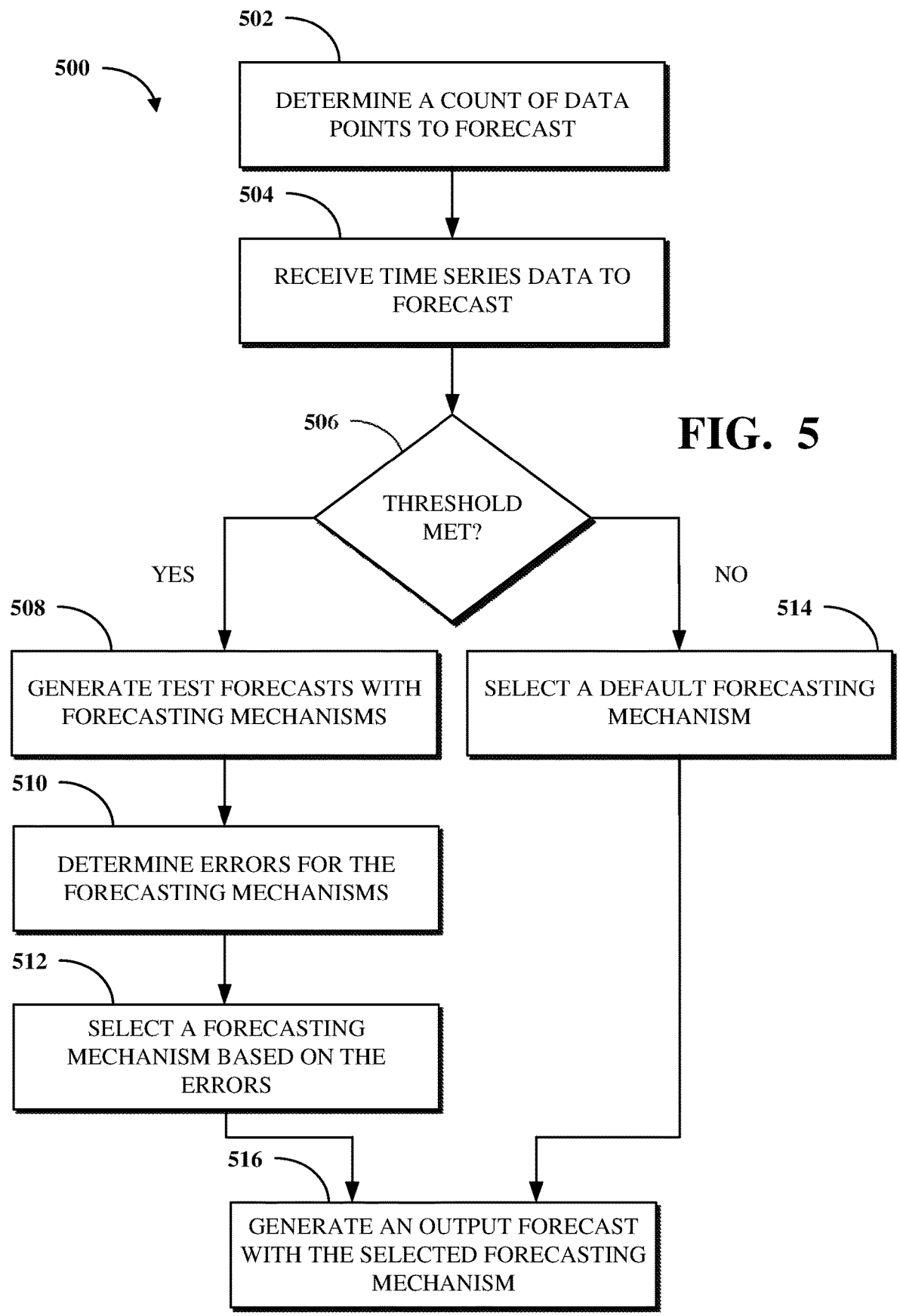
FIG. 5 is a flowchart illustrating an example of a technique for time series data forecasting.

FIG. 5 is a flowchart illustrating an example of a technique 500 for time series data forecasting. The technique 500 can be executed using computing devices, such as the systems, modules, and devices described with respect to FIGS. 1-4. The technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

In an implementation, the technique 500 includes determining a count of data points to forecast via 502, receiving time series data to forecast via 504, determining whether a threshold is met via 506, generating test forecasts with forecasting mechanisms via 508, determining errors for the forecasting mechanism via 510, selecting a forecasting mechanism based on the errors via 512, selecting a default forecasting mechanism via 514, and generating an output forecast with the selected forecasting mechanism via 516.

At 502, the count of data points to forecast is determined. The count of data points to forecast (e.g., the forecast count) can be determined based on input received from a user of a customer instance (e.g., an instance of platform software). For example, the customer instance can include one or more forms using which the user can provide input such as a total number of forecast data points to generate, a number of periods over which to forecast time series data ($P_f$), or the like, or a combination thereof. For example, the user may want to view a forecast of the next one hundred values for an indicator. The user may thus indicate that one hundred data points will be included in an output forecast to be generated, and the forecast count would be one hundred. In another example, the user may indicate to generate the output forecast to show forecasted data points over three months, one year, or another period.

At 504, time series data to forecast is received. The time series data includes a plurality of data points. For example, the time series data can be the time series data 404 shown in FIG. 4. The time series data 404 can include values of indicators associated with attributes of a computing device of a computer network associated with the customer instance, values of resources of the computing device, failures of the computing device or other components of the computer network, or the like. For example, a user of the customer instance can indicate or otherwise select the time series data to be forecasted, such as using a form of the customer instance. For example, the form can include a field for selecting an indicator for which to forecast, such as based on indicator values collected for that indicator.

As described above with respect to FIG. 4, the data points of the time series data may be collected at discrete time intervals, such as by the minute, hour, day, week, or other periodicity. A frequency to use to forecast the time series data can be determined based on a time interval over which the data points thereof are collected. For example, if the data points of the time series data is collected daily, the frequency for forecasting the time series data can be daily. A period of time can have an associated period length (PL) based on the frequency for forecasting the time series data. For example, a one-year period of time can have a PL of four when the frequency is quarterly or a PL of twelve when the frequency is monthly. The forecast count can thus be used to determine the PL associated with a period of the $P_f$.

Depending on the values of the count of data points of the time series data ($N_d$), $P_f$, and PL, some of the forecasting mechanisms may not be available for selection, such as to generate an output forecast for the time series data. For example, a forecasting mechanism may require that at least a minimum number of data points or periods of time be incorporated into the time series data. Examples of minimum requirements for some forecasting mechanisms are described above with respect to FIG. 4 and shown in Table 2.

In some implementations, the time series data can be dependent upon the determined count of data points, described above. For example, the time series data may include hundreds or thousands of indicator values generated for a particular indicator. For example, those indicator values may have been collected over a number of months or years. As such, a portion of the time series data may not be relevant to the forecasting, such as earlier-collected data points. For example, the forecast count determined above can be used to determine a period of time over which to forecast the time series data, and the period of time can be used along with an associated frequency to determine a PL. The count of data points of the time series data to use for the forecasting can be limited to four times the PL. Other minimums or maximums may be used.

At 506, it is determined whether a count of the data points of the time series data meets a threshold. The determination at 506 can be performed, for example, using the threshold checker 408 shown in FIG. 4. The threshold can be met when the time series data includes enough data points to generate an output forecast. For example, the threshold can be based on a minimum count of data points and a forecast count of data points to forecast. For example, the forecast count can be determined based on the number of periods to forecast specified by a user of the customer instance and the PL associated with that number of periods to forecast.

The time series data may be deemed to include a first subset of data points. For example, the count of the first subset of data points can equal the count of data points of the time series data minus the forecast count (e.g., specified by the user of the customer instance). The minimum count of data points can be equal to two times the PL associated with the $P_f$ and frequency specified by the user of the customer instance. A determination can be made that the count of the data points of the time series data meets the threshold where the count of the first subset of data points is greater than or equal to the minimum count of data points.

At 508, responsive to determining that the count meets the threshold, a plurality of test forecasts are generated with respective forecasting mechanisms of a plurality of forecasting mechanisms using a first subset of the plurality of data points. The time series data may be deemed to include a second subset of data points. The count of the second subset of data points can be equal to the forecast count. Generating a test forecast can include excluding the second subset of the data points of the time series data from use in the generating. The test forecasts can be generated at 508, for example, using the forecasting mechanism decider 410 shown in FIG. 4. For example, generating the test forecasts can include running a plurality of forecasting mechanisms against a subset of data points (e.g., the first set of data points of the time series data) to generate respective test forecasts. A test forecast generated with a forecasting mechanism using the first subset of data points can include a number of data points equal to the forecast count. The test forecast can be generated by running the forecasting mechanism against the first subset of data points of the time series data. The test forecasts can include data points generated with respective forecasting mechanisms using the first subset of data points. The test forecasts are discarded, such as responsive to a selection of one of the forecasting mechanisms, described below.

At 510, errors for the respective forecasting mechanisms are determined. The errors can be determined, for example, by comparing corresponding ones of the test forecasts to the second subset of the data points of the time series data. For example, determining the errors can include determining a mean absolute scaled error score for each one of the test forecasts and the second subset of data points, such as to identify an error score for each one of the forecasting mechanisms with which test forecasts were generated. The errors for the respective forecasting mechanisms can be determined at 510, for example, using the forecasting mechanism decider 410 shown in FIG. 4.

At 512, one of the forecasting mechanisms with which the test forecasts were generated is selected based on the errors. Selecting a forecasting mechanism based on the errors can include determining that a test forecast generated with the forecasting mechanism has a lowest MASE score, such as compared to the MASE scores determined for the respective forecasting mechanisms. Alternative ways for selecting the forecasting mechanism are possible. For example, the first test mechanism with an error score below a pre-determined threshold may be selected so as to avoid generating and testing any remaining forecasting mechanisms. The selected forecasting mechanism can be selected at 512, for example, using the forecasting mechanism decider 410 shown in FIG. 4.

At 514, responsive to determining that the count of the plurality of data points does not meet the threshold at 506, a default forecasting mechanism of the plurality of forecasting mechanisms is selected. Selecting the default forecasting mechanism at 514 can thus omit the generation of test forecasts, the determination of errors, or the selection of a forecasting mechanism based on errors from the technique 500, such as at 508, 510, or 512, respectively. The default forecasting mechanism can be selected from the plurality of forecasting mechanisms according to an order of the plurality of forecasting mechanisms and requirements of the plurality of forecasting mechanisms. The default forecasting mechanism can be selected at 514, for example, using the default forecasting mechanism selector 412 shown in FIG. 4.

At 516, an output forecast is generated with the selected forecasting mechanism using the first and second subsets of the plurality of data points. The output forecast can be generated with consideration of all of the data points of the time series data. For example, generating the output forecast with the selected forecasting mechanism can include running the selected forecasting mechanism against a set of data points comprising the time series data. The output forecast can be generated at 516, for example, using the output forecast generator 414 shown in FIG. 4.

Although the technique 500 is shown as a series of operations for clarity, implementations of the technique 500 or other techniques, methods, processes, and/or algorithms described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

In some implementations, the technique 500 can include reusing the selected forecasting mechanism. For example, the selected forecasting mechanism can be reused at a later time to generate a new output forecast for the time series data, to generate an output forecast for a different set of time series data, or for another purpose. For example, the selected forecasting mechanism can be reused as described above with respect to FIG. 4.

In some implementations, the count of the data points to forecast can be determined and the time series data received in one operation. For example, the selection or indication of the time series data can be dependent upon the count of data points to forecast, or the count of data points to forecast can be dependent upon the selection or indication of the time series data.

FIG. 6 is an illustration of an example of a graph 600 showing time series data forecasting. The graph includes a sequence 602 of data points of time series data and a sequence 604 of data points of an output forecast. For example, the data points of the output forecast shown in the sequence 604 can be generated using data points of the time series data shown in the sequence 602. The data points of the sequence 602 may be indicator values generated using an instance of platform software. For example, the indicator values may be generated using the time series data generator 312 shown in FIG. 3. The data points of the sequence 604 may, for example, be generated using the time series data forecaster 314 shown in FIG. 3. The sequence 602 can include one or more interpolated data points, such as the interpolated data point 606. A period 608 shows the data points of the sequence 602 that correspond to a period of time over which the data points of the time series data may be forecasted. For example, the count of data points included within the period 608 can equal a PL associated with that period 608.

Figure 7:
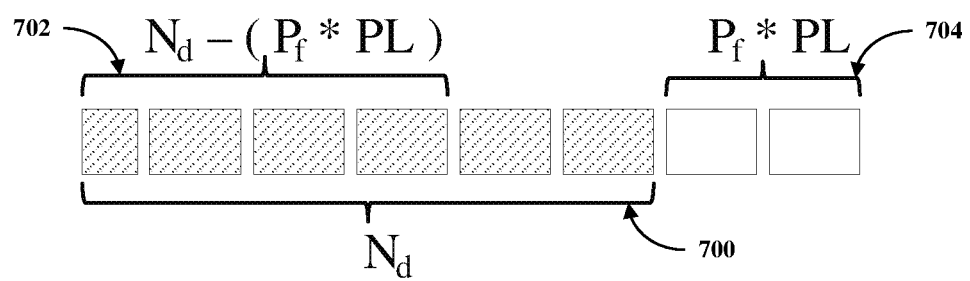
FIG. 7 is an illustration of an example of subsets of time series data to forecast.

FIG. 7 is an illustration of an example of data points included in time series data forecasting. Data points comprising time series data (e.g., the time series data 404 shown in FIG. 4) are shown as $N_d$ at 700, where $N_d$ represents the count of time series data to forecast. Data points comprising a first subset of the data points of the time series data are shown as $N_d-(P_f*PL)$ at 702, where, as described above, $P_f$ represents the number of periods of time to forecast and PL represents the period length associated with the periods. Data points comprising an output forecast (e.g., the output forecast 402 shown in FIG. 4) are shown as $P_f*PL$ at 704. Data points comprising a second subset of data points of the time series data are those data points included in the subset shown at 700 and not in the subset shown at 702. The count of data points of the second subset of data points is equal to the count of data points of the output forecast shown at 704. For example, the count of data points of the second subset of data points can also be represented as $P_f*PL$.

An implementation includes means for receiving time series data to forecast, the time series data including a plurality of data points; means for determining that a count of the plurality of data points meets a threshold; means for, responsive to determining that the count meets the threshold, generating a plurality of test forecasts with respective forecasting mechanisms of a plurality of forecasting mechanisms using a first subset of the plurality of data points; means for determining errors for the respective forecasting mechanisms by comparing corresponding ones of the plurality of test forecasts to a second subset of the plurality of data points; means for selecting one of the plurality of forecasting mechanisms based on the errors; and means for generating an output forecast with the selected forecasting mechanism using the first and second subsets of the plurality of data points.

An implementation includes means for determining a count of data points to forecast; means for running a plurality of forecasting mechanisms against a subset of data points to generate respective test forecasts, wherein the subset of data points excludes, from a set of data points, excluded data points according to the count of data points to forecast; means for determining respective errors for the plurality of forecasting mechanisms based at least on comparisons between data points of the respective test forecasts and the data points excluded from the subset of data points; means for selecting a forecasting mechanism from the plurality of forecasting mechanisms based at least on the respective errors; and means for running the selected forecasting mechanism against the set of data points.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for time series data forecasting, the system comprising:
    a memory; and
    a processor,
    wherein the memory includes instructions executable by the processor to:
    receive an input indicative of a specified number of forecast data points to generate;
    calculate, based on the input, a threshold number of forecast data points comprising a minimum number of forecast data points used by each of a plurality of forecasting mechanisms to generate respective test forecasts;
    receive time series data comprising a plurality of data points;
    separate the time series data into a first subset of the plurality of data points and a second subset of the plurality of data points;
    determine that a count of the plurality of data points in the first subset meets the threshold number of data points;
    responsive to the determination that the count meets the threshold number of data points, generate the respective test forecasts with the plurality of forecasting mechanisms using the first subset of the plurality of data points as inputs to the plurality of forecasting mechanisms;
    determine respective errors for the plurality of forecasting mechanisms, comprising comparing the respective test forecasts to the second subset of the plurality of data points;
    select one of the plurality of forecasting mechanisms based on the errors; and
    generate an output forecast with the selected forecasting mechanism using the first and second subsets of the plurality of data points as inputs to the selected forecasting mechanism, wherein the output forecast comprises a count of forecast data points equal to a count of the plurality of data points in the second subset and the specified number of data points to forecast.

2. The system of claim 1, wherein the time series data includes values of indicators associated with attributes of a computing device of a computer network, wherein the computer network is associated with an instance of platform software used to generate the time series data.

3. The system of claim 1, wherein a data point of the plurality of data points indicates that a computing device of a computer network experienced a failure, wherein the computer network is associated with an instance of platform software used to generate the time series data.

4. The system of claim 1, wherein the instructions to generate the respective test forecasts with the plurality of forecasting mechanisms using the first subset of the plurality of data points as inputs to the plurality of forecasting mechanisms include instructions to:
    exclude the second subset of the plurality of data points from use in the generation of the respective test forecasts.

5. The system of claim 1, wherein the instructions to determine the respective errors for the plurality of forecasting mechanisms include instructions to:
    determine respective mean absolute scaled error scores for the respective test forecasts based on the plurality of forecasting mechanisms with which the respective test forecasts are generated.

6. The system of claim 5, wherein the instructions to select one of the plurality of forecasting mechanisms based on the errors include instructions to:
    select a forecasting mechanism of the plurality of forecasting mechanisms responsive to a determination that one of the respective test forecasts generated with the selected forecasting mechanism has a lowest mean absolute scaled error score.

7. The system of claim 1, wherein the time series data is first time series data and the output forecast is a first output forecast, wherein the instructions include instructions to:
    receive second time series data; and
    generate a second output forecast for the second time series data with the selected forecasting mechanism using data points of the second time series data.

8. The system of claim 1, wherein the instructions include instructions to:
    select a default forecasting mechanism of the plurality of forecasting mechanisms responsive to a determination that the count of the plurality of data points does not meet the threshold number of data points.

9. The system of claim 8, wherein the default forecasting mechanism is selected from the plurality of forecasting mechanisms according to an order of the plurality of forecasting mechanisms and requirements of the plurality of forecasting mechanisms.

10. The system of claim 1, wherein the threshold number of data points is a first threshold number of data points and the data points of the plurality of data points correspond to incidents associated with an instance of platform software used to generate the time series data, wherein the instructions include instructions to:
    responsive to a determination that the count of the plurality of data points in the first subset meets a second threshold number of data points, perform a remedial action to resolve at least some of the incidents.

11. The system of claim 1, wherein the memory includes instructions executable by the processor to:
    identify a gap between two data points of the plurality of data points in the time series data; and
    generate one or more interpolated data points between the two data points of the plurality of data points in the time series data based on one or more neighboring data points within the plurality of data points in the time series data; and
    add the one or more interpolated data points to the time series data.

12. The system of claim 1, wherein the data points of the time series data are associated with one or more information technology incidents.

13. A method for time series data forecasting, the method comprising:
- receive an input indicative of a specified number of forecast data points to generate;
- calculating, based on the input, a threshold number of forecast data points comprising a minimum number of forecast data points used by each of a plurality of forecasting mechanisms to generate respective test forecasts;
- receiving time series data comprising a plurality of data points;
- separating the time series data into a first subset of the plurality of data points and a second subset of the plurality of data points;
- determining that a count of the plurality of data points in the first subset meets the threshold number of data points;
- responsive to determining that the count meets the threshold number of data points, generating the respective test forecasts with the plurality of forecasting mechanisms using the first subset of the plurality of data points as inputs to the plurality of forecasting mechanisms;
- determining respective errors for the plurality of forecasting mechanisms by comparing the respective test forecasts to the second subset of the plurality of data points;
- selecting one of the plurality of forecasting mechanisms based on the errors; and
- generating an output forecast with the selected forecasting mechanism using the first and second subsets of the plurality of data points as inputs to the selected forecasting mechanism, wherein the output forecast comprises forecast data points based on the plurality of data points in the second subset and the specified number of data points to forecast.

14. The method of claim 13, wherein generating the respective test forecasts with the plurality of forecasting mechanisms using the first subset of the plurality of data points as inputs to the plurality of forecasting mechanisms comprises:
- excluding the second subset of the plurality of data points from use in generating the respective test forecasts.

15. The method of claim 13, wherein determining the respective errors for the plurality of forecasting mechanisms by comparing the respective test forecasts to the second subset of the plurality of data points comprises:
- determining respective mean absolute scaled error scores for the respective test forecasts based on the plurality of forecasting mechanisms with which the respective test forecasts are generated.

16. The method of claim 15, wherein selecting one of the plurality of forecasting mechanisms based on the errors comprises:
- selecting a forecasting mechanism of the plurality of forecasting mechanisms responsive to determining that one of the respective test forecasts generated with the selected forecasting mechanism has a lowest mean absolute scaled error score.

17. The method of claim 13, the method comprising:
- selecting a default forecasting mechanism of the plurality of forecasting mechanisms responsive to determining that the count of the plurality of data points does not meet the threshold number of data points.

18. A non-transitory computer-readable storage medium, comprising processor-executable routines that, when executed by a processor, facilitate a performance of operations comprising:
- receive an input indicative of a specified number of forecast data points to generate;
- calculating, based on the input, a threshold number of forecast data points comprising a minimum number of forecast data points used by each of a plurality of forecasting mechanisms to generate respective test forecasts;
- separating time series data comprising a plurality of data points into a first subset of the plurality of data points and a second subset of the plurality of data points;
- determining that a count of the plurality of data points in the first subset meets the threshold number of data points;
- running the plurality of forecasting mechanisms using the first subset of the plurality of data points as inputs to generate the respective test forecasts, wherein the first subset of the plurality of data points excludes the second subset of the plurality of data points;
- determining respective errors for the plurality of forecasting mechanisms based at least on comparisons between data points of the respective test forecasts and the second subset of the plurality of data points;
- selecting a forecasting mechanism from the plurality of forecasting mechanisms based at least on the respective errors; and
- running the selected forecasting mechanism using the plurality of data points as inputs to generate an output forecast comprising a count of forecast data points equal to the count of data points to forecast and the specified number of data points to forecast.

* * * * *